UNITED STATES PATENT OFFICE.

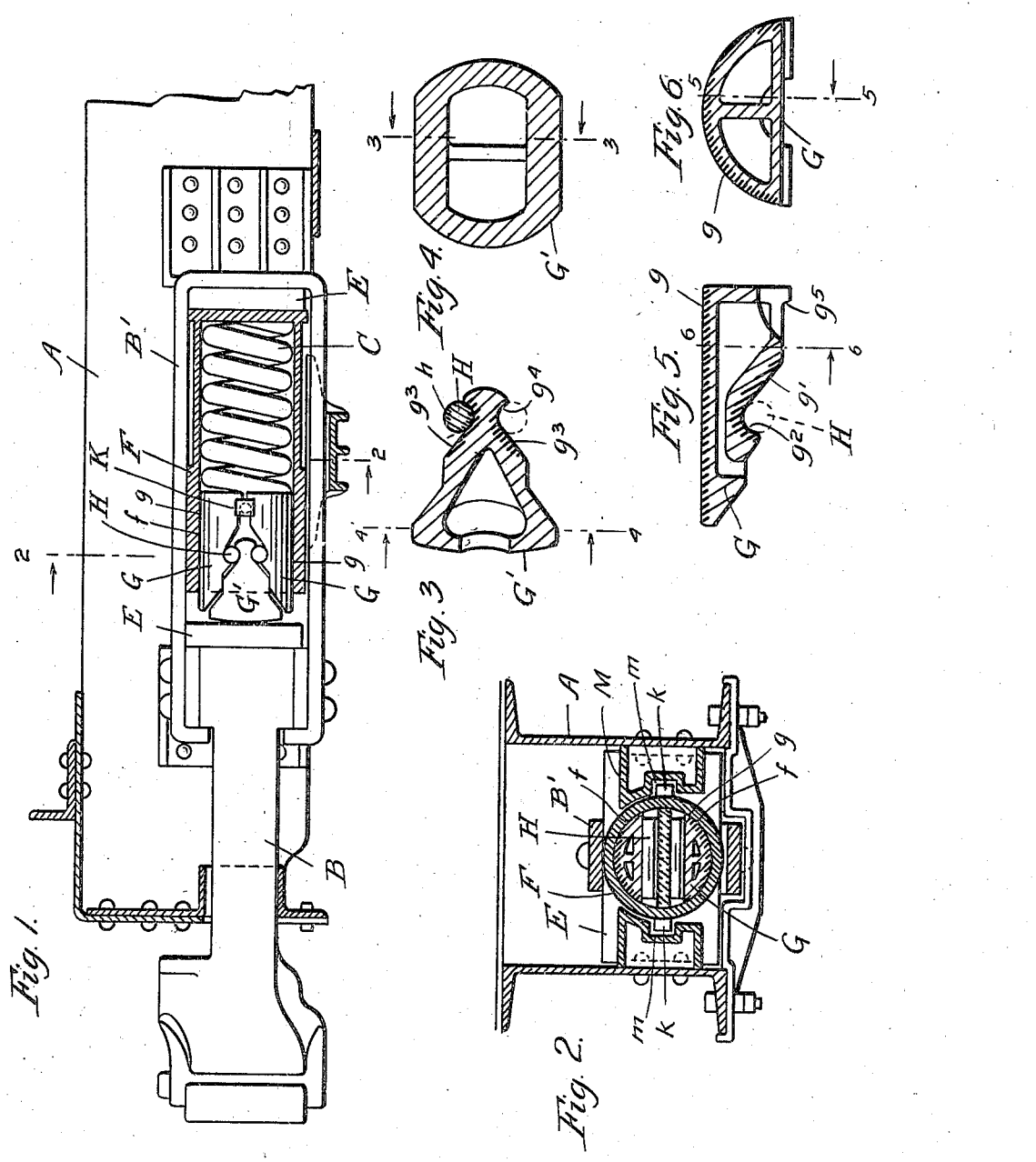

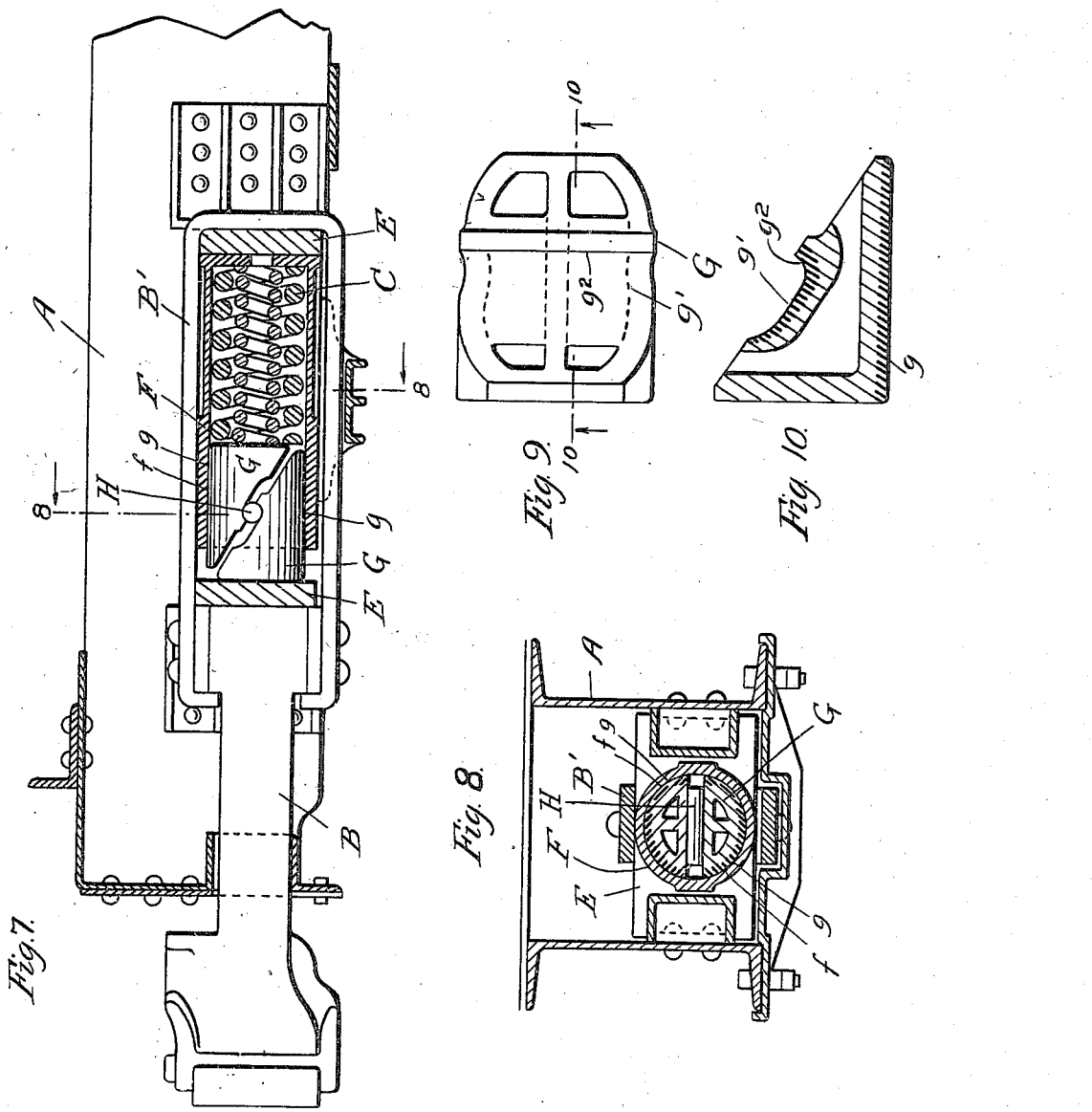

CHARLES J. NASH, OF CHICAGO, ILLINOIS, ASSIGNOR, BY MESNE ASSIGNMENTS, TO WILLIAM H. MINER, OF CHICAGO, ILLINOIS.

FRICTION DRAFT-RIGGING FOR RAILWAY-CARS.

1,193,411.  Specification of Letters Patent.  Patented Aug. 1, 1916.

Application filed February 10, 1908. Serial No. 415,020.

*To all whom it may concern:*

Be it known that I, CHARLES J. NASH, a citizen of the United States, residing in Chicago, in the county of Cook and State of Illinois, have invented a new and useful Improvement in Friction Draft-Rigging for Railway-Cars, of which the following is a specification.

My invention relates to improvements in friction draft rigging for railway cars.

Heretofore with the friction draft rigging commonly in use, great practical difficulty is experienced from the friction surfaces of the friction devices unduly cutting and wearing each other, and the practical operation of such devices is also rendered uncertain, unsafe and unreliable, because of the great variations that occur in the frictional resistance produced by the friction devices at different times and by different friction draft riggings of precisely the same shape and construction, apparently owing to different conditions of the cast or other metal parts composing the structure.

The object of my invention is to provide a friction draft rigging that will obviate the difficulties and objections heretofore experienced, and in which the friction devices will neither on the one hand unduly wear, nor on the other hand, fail to produce the proper amount of frictional resistance, and this with certainty, uniformity and reliability.

I have discovered that this object or result may be practically accomplished, and herein my invention consists by constructing the friction shell of the draft rigging of malleable iron, and combining with it friction blocks of cast steel, preferably a low carbon cast steel, the friction surfaces of which are hardened by application to the friction surfaces of the cast steel friction blocks of cyanid of potassium, while the blocks are at a high heat, preferably a cherry red temperature, and then immersing the blocks in a hardening or tempering liquid, preferably cold water. I describe the said friction surfaces so hardened by calling them cyanid-hardened. The anti-friction roller or rollers interposed either directly between the friction blocks or between them and a wedge or spreader device interposed between the friction blocks may be of spring steel, tempered or hardened by immersion while at a high or cherry red temperature in a hardening or tempering liquid, preferably oil. The surfaces of the cast steel wedge which contact with the anti-friction rollers and the inclined faces of the friction blocks which contact with the anti-friction rollers are cyanid hardened, the same as the friction surfaces of the cast steel friction blocks.

In the accompanying drawing forming a part of this specification, I have, to enable my invention to be more readily understood, illustrated it as applied to two different forms of friction draft rigging; Figures 1 to 6 showing it as applied to a friction draft rigging in which a wedge is employed between the friction blocks within the friction shell, and Figs. 7 to 10 showing it as applied to a friction draft rigging where the anti-friction roller is interposed directly between the friction blocks.

In the drawing, Fig. 1 is a side elevation partly in vertical section of a friction draft rigging embodying my invention. Fig. 2 is a cross section on the broken line 2—2 of Fig. 1. Fig. 3 is a detail central, vertical, longitudinal section of the wedge and of the anti-friction rollers. Fig. 4 is a detail section on line 4—4 of Fig. 3. Fig. 5 is a detail, longitudinal vertical section of one of the friction blocks, taken on line 5—5 of Fig. 6. Fig. 6 is a detail section on line 6—6 of Fig. 5. Fig. 7 is a side elevation, partly in vertical section showing a modified construction. Fig. 8 is a section on the broken line 8—8 of Fig. 7. Fig. 9 is a detail plan view of one of the friction blocks and Fig. 10 is a section on line 10—10 of Fig. 9.

In the drawing, A represents the center sills or other frame pieces of the car to which the draft rigging is applied, B the draw-bar, $B^1$ the yoke, C a longitudinally arranged direct acting draft rigging spring, E, E, the followers, F a malleable iron longitudinally movable friction shell, preferably in cylindrical form and having a longitudinally extending cylindrical interior friction face $f$.

G G are cast steel longitudinally movable friction blocks within the shell F and having cyanid hardened longitudinally extending exterior friction faces $g$ $g$ in sliding frictional engagement with the interior friction faces of the friction shell F, and each having a wedging or inclined cyanid hardened anti-friction roller bearing face $g^1$ furnished with shoulders $g^2$ to limit the travel of the roller H thereon which is interposed between the same and the wedge or spreader block $G^1$.

The wedge or spreader block G¹ which is interposed between the front follower and the friction blocks is of cast steel and has cyanid hardened roller bearing faces $g^3$ for contacting with the anti-friction rollers H H. The anti-friction rollers H are of spring steel, hardened and tempered, as indicated at $h$ in the drawing, by immersing them when at a high or cherry red temperature in a hardening or tempering liquid, preferably oil. This construction of the anti-friction rollers prevents fragility or liability of fracture, and renders them hard and durable and gives them a slight degree of elasticity, enabling them to better conform to the inclined or wedging faces of the wedge and friction blocks upon which they roll. The wedge G¹ is preferably furnished with shoulders $g^4$ to keep the wedge in its assembled position between the friction blocks when said blocks are within the malleable iron friction shell F. To keep the friction blocks G from turning in the shell, and all the parts in assembled position, a pin or rivet K is inserted between the friction blocks and horizontally through the shell F, its heads or ends $k$ fitting in longitudinal grooves or ways $m$ in the side plates or stop castings M, and thus also keeping the friction shell itself from turning. The friction blocks have shoulders $g^5$ at their rear ends to engage this pin or rivet and limit their outward movement in respect to the shell and thus hold the spring and other parts within the shell in assembled position for convenience in applying or removing the draft rigging from the car.

In the modification illustrated in Figs. 7 to 10, the construction is substantially the same, excepting that the wedge G¹ is omitted and but a single anti-friction roller is employed, the same being interposed directly between the inclined or wedging faces of the friction blocks.

To lighten the friction blocks and the wedge, the same are preferably interiorly cored as illustrated in the drawings.

My experiments have demonstrated that by combining with a malleable iron friction shell, cast steel friction blocks having their friction faces and also their roller bearing faces cyanid hardened, the friction devices are rendered very durable, while at the same time a high degree of frictional resistance is produced, and this with certainty, uniformity and reliability of action. My experiments have also shown that it is essential that the friction blocks should be made of cast steel, as the same results are not produced by employing friction blocks of forged steel and treating their friction and roller bearing surfaces with cyanid of potassium in connection with the hardening or tempering treatment. The cast steel structure has a very different function or mode of operation and produces a very different result from forged steel or any other metal that I have similarly treated and experimented with in this friction draft rigging combination.

In my invention, the interior body portion of each friction block being of soft steel, while the exterior friction face layer thereof is of cyanid hardened steel and the exterior wedge face layer also of cyanid hardened steel, the friction block is adapted to successfully withstand without danger of fracture or other injury, the heavy pressures and blows to which it is subjected from its tangential contact with the anti-friction roller which is acted upon by the wedge which multiplies and imparts to the friction block through the anti-friction roller the shocks of the draw-bar; while at the same time, each of the friction blocks, by reason of their cyanid hardened friction face layers in sliding frictional engagement with the malleable iron friction shell, produce a very high frictional resistance without appreciable wear of either the friction blocks or the friction shell. In my invention the hardened friction face of the friction block sliding against the soft interior friction face of the malleable iron shell is and remains under use extremely smooth and highly polished, and the friction face of the malleable iron shell, by reason of its relative softness, accurately adapts and conforms itself to the smooth, polished friction face of the block, so that in the sliding of the block on the shell under heavy pressure, the force is largely absorbed or consumed in the production of heat and is but very slightly exerted in or represented by work done in wearing away the metal of either the shoe or shell. The heat produced at each cushioning movement is very quickly absorbed and dissipated by the relatively large mass of metal in the friction shell and friction blocks and connected parts between successive cushioning movements of the draft rigging which ordinarily are not very frequent. The frictional action of my hardened friction face cast steel blocks on the malleable iron shell is thus somewhat in the nature of the action of a hardened steel and highly polished spinning tool upon and against copper or other soft metal in a metal spinning operation, which, as is well known, produces much heat but no appreciable abrading or wearing away of metal, either that of the hardened steel spinning tool or that of the copper, brass or other relatively soft metal being spun. To secure effective coöperative action of the anti-friction rollers in producing certain and reliable release action of the friction draft rigging, it is important that the roller bearing or wedge faces of the friction blocks and also of the wedge be of hardened steel, as otherwise the tangential contact of the anti-friction rollers with these wedge faces would be liable, under the heavy blows of the draw-bar, to tend to embed the rollers in the friction blocks or wedge (the interior body portions of which are of relatively soft cast steel to enable them to withstand the draw-bar blows without injury) and thus prevent the anti-friction rollers from performing their necessary function of effecting a certain and reliable release action of the friction mechanism under action of the compressed spring.

I claim:

1. In a friction draft rigging, the combination with the draw-bar, spring and followers, of a longitudinally movable malleable iron friction shell and cast steel friction blocks within the shell having cyanid hardened friction surfaces frictionally engaging said friction shell, the interengaging friction surfaces of said blocks and shell coöperating to produce both high frictional resistance to movement and also durability against wear, substantially as specified.

2. In a friction draft rigging, the combination with the draw-bar, spring and followers, of a longitudinally movable malleable iron friction shell and cast steel friction blocks within the shell having cyanid hardened friction surfaces frictionally engaging said friction shell, said friction blocks having each an inclined cyanid hardened anti-friction roller bearing face, the interengaging friction surfaces of said blocks and shell coöperating to produce both high frictional resistance to movement and also durability against wear, substantially as specified.

3. In a friction draft rigging, the combination with the draw-bar, spring and followers, of a longitudinally movable malleable iron friction shell and cast steel friction blocks within the shell having cyanid hardened friction surfaces frictionally engaging said friction shell, the interengaging friction surfaces of said blocks and shell coöperating to produce both high frictional resistance to movement and also durability against wear, said friction blocks having each an inclined cyanid hardened anti-friction roller bearing face, and a hardened steel anti-friction roller having a rolling action upon said roller bearing face of one of said blocks, substantially as specified.

4. In a friction spring draft rigging, the combination with the draw-bar, followers and spring, of a longitudinally movable malleable iron friction shell, cast steel friction blocks within said shell having cyanid hardened exterior friction faces contacting with said shell, and provided each with an inclined or wedging cyanid hardened roller bearing face, a cast steel wedge between said friction blocks having cyanid hardened inclined roller bearing faces, and anti-friction rollers between said wedge and friction blocks, the interengaging friction surfaces of said blocks and shell coöperating to produce both high frictional resistance to movement and also durability against wear, substantially as specified.

CHARLES J. NASH.

Witnesses:
H. M. MUNDAY,
PEARL ABRAMS.

Copies of this patent may be obtained for five cents each, by addressing the "Commissioner of Patents, Washington, D. C."